United States Patent [19]

Dodd

[11] 4,450,080
[45] May 22, 1984

[54] APPARATUS FOR REMOVING EXCESS LIQUID AND CONTAMINANTS FROM BELT FILTER CAKE

[76] Inventor: Joseph C. Dodd, 6745 Alisal St., Pleasanton, Calif. 94566

[21] Appl. No.: 425,323

[22] Filed: Sep. 28, 1982

[51] Int. Cl.³ ............. B01D 33/04; B01D 33/36
[52] U.S. Cl. ................. 210/391; 210/400; 210/402; 210/408; 15/302; 15/306 A
[58] Field of Search .......... 210/386, 391, 396, 400, 210/401, 402, 406, 407, 410, 416.1, 107, 258, 408, 409; 47/1.4; 134/15, 21, 122 R; 15/302, 306 A

[56] References Cited

U.S. PATENT DOCUMENTS

| | | | |
|---|---|---|---|
| 917,305 | 4/1909 | Johnson | 210/402 |
| 2,092,111 | 9/1937 | Dons et al. | 210/396 |
| 2,278,525 | 3/1942 | Rich et al. | 210/386 |
| 3,915,859 | 10/1975 | Sundin et al. | 210/401 |
| 3,951,805 | 4/1976 | Dodd | 210/386 |
| 4,168,236 | 9/1979 | Bähr | 210/400 |
| 4,255,261 | 3/1981 | Dodd | 210/386 |

FOREIGN PATENT DOCUMENTS

| | | | |
|---|---|---|---|
| 4720548 | 8/1968 | Japan | 210/400 |
| 161409 | 3/1951 | Sweden | 210/402 |

Primary Examiner—Charles N. Hart
Assistant Examiner—John W. Czaja
Attorney, Agent, or Firm—Lothrop & West

[57] ABSTRACT

An apparatus for removing excess liquid and contaminants from a belt filter cake includes a perforated main belt extending over a separation drum. An anti-wear permeable belt has one portion lying against part of the main belt supported by the separation drum. There are exterior suction headers and chambers effective through the anti-wear belt and main belt and a main suction box within the separation drum for cake recovery where the main belt is in contact therewith. Wash water nozzles are within the separation drum directed toward the exterior suction headers and chambers.

8 Claims, 1 Drawing Figure

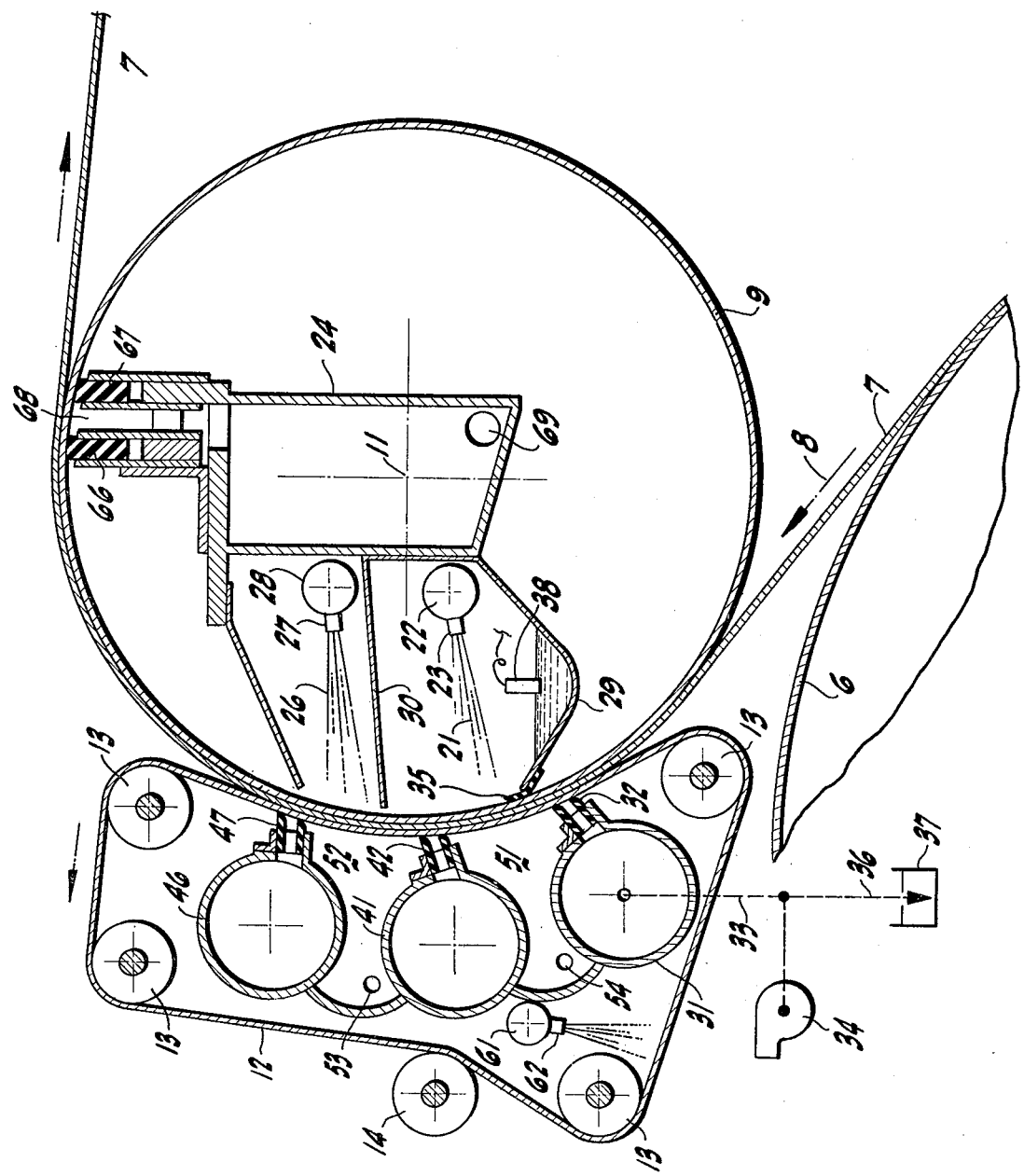

APPARATUS FOR REMOVING EXCESS LIQUID AND CONTAMINANTS FROM BELT FILTER CAKE

BRIEF SUMMARY OF THE INVENTION

An apparatus is disclosed for removing excess liquid and contaminants from a layer of deposited solids or "cake". Algal solids will be used as an example. These have been separated from a liquid medium and deposited on a belt filter by means of a rotary filtration drum. The solids are transported on a travelling main belt to a separation drum where the solids are recovered from the belt by suction. The solids recovery takes place in a main suction box mounted inside the separation drum. A suction slot in the suction box is sealed against the interior of the perforated separation drum wall. The solids concentration of the recovered algal slurry depends on the cake moisture content, cake thickness, and moisture entrained in the belt fabric and separation drum wall perforations. A moisture content sufficient to allow good solids recovery at the main suction box is typically less than that carried over at higher belt travel speeds, and removal of this excess liquid is desirable to increase slurry solids concentration. Excess liquid removal is accomplished by one or more exterior suction headers having a slot with seals closely approaching or contacting the main belt in the active region of the separation drum prior to the cake reaching the main suction box. The solids are confined between the separation drum and the main belt and are prevented from entering the suction header due to the perforation size of the main belt being smaller than the particle size of the solids.

Furthermore, removal of contaminants such as salts and absorbed heavy metals may be desirable or necessary and is provided for by washing the cake while it is in the active region of the separation drum. Washing is accomplished by spray nozzles located inside the separation drum directed toward the active region. Spray liquid is absorbed and preferably pulled through the cake by a vacuum maintained within a chamber or chambers located between the suction headers and/or the suction headers themselves. The vacuum is maintained by vacuum blowers with provisions for liquid separation through a barometric leg or pump. The rate of application of spray liquid is adjusted to prevent liquid running down the interior of the drum. Any excess liquid which would otherwise run down is caught in a separator plate trough with flexible seal, and a sensor may be used to control the spray application rate.

The resilient seals of the suction headers need to be in close contact with the main belt to avoid excessive air leakage. Ideally, the seals would not touch the fabric, but this is often not possible, particularly when the separation drum is not perfectly round. To avoid excessive wear on the fine-weave main belt, which has relatively fine filament diameter, a coarser-weave "anti-wear" belt may be interposed between the suction header seals and the main belt to cause the seals to rub on the anti-wear belt. The anti-wear belt is disposed in a loop having a portion in contact with the active portion of the main belt. The anti-wear belt is supported by a number of rollers, one of which serves to induce belt tension, causing it to press against the main belt in the active portion. No sliding friction occurs on the main belt, the anti-wear belt being driven by the main belt with both moving together by static friction.

PRIOR ART

Reference is made to U.S. Pat. No. 3,951,805 of Apr. 20, 1976 as well as to U.S. Pat. No. 4,255,261 of Mar. 10, 1981. These patents show somewhat comparable environments and structures.

BRIEF DESCRIPTION OF THE DRAWING

The FIGURE is a diagrammatic view in cross-section on a transverse plane showing the major portions and the construction of the apparatus for removing excess liquid and contaminants from a belt filter cake. The FIGURE and description show the full embodiment of the apparatus; however, only portions of the full embodiment may be used to advantage under differing circumstances. For example, one or more liquid removal and washing stages may be used, and the anti-wear belt may or may not be used.

DETAILED DESCRIPTION

In connection with the separation of algae (for example, Spirulina) contained in a liquid medium, usually the water in which the algae have been growing, there is preferably provided a filtration drum 6 arranged to rotate upon an appropriate axis (not shown) and supporting around it a main belt 7 of a foraminous or perforated nature on which algae and some of the environmental water are transported. Herein "foraminous" or "perforated" mean that the belt has passages therethrough of predetermined size. The algae and the water are carried in the direction of the arrow 8 to travel onto and around a portion of a perforated separation drum 9 likewise of foraminous material and rotatable about a transverse axis 11 so that the drums 6 and 9 are nearly but not quite tangent. The main belt 7, in going around one portion of the separation drum 9, is overlain or contacted by an anti-wear belt 12 constructed of fabric having larger openings and filament diameter than the main belt and trained around a number of individual rollers 13. The purpose of the anti-wear belt 12 is to reduce the wear on the main belt 7 which would occur if the seals subsequently described were to rub directly on the main belt. There is also a take-up or tension roller 14 so that the anti-wear belt is caused to lie closely against the adjacent portion of the main belt 7. The roller 14 can also be used for adjusting the tracking of the anti-wear belt 12, by adjusting the relative position of one of the roller end bearings. The solids deposited on the main belt during filtration are interposed between the surface of the drum 9 and the surface of the main belt 7, which may also be overlain for a portion of the arc of its advancement by the anti-wear belt 12. In addition to the desired solids in the cake, such as algae, there are often entrained or absorbed deleterious materials such as salts and heavy metals precipitates. During a large portion of this arc the deleterious materials are caused largely to separate. In part this is accomplished by means of a first-stage wash spray 21 from a manifold 22 having nozzles 23 thereon and located within the separation drum. Preferably the manifold 22 is supported on a suction box 24 disposed within the separation drum and carried by a suitable end support (not shown) in the customary fashion. The spray 21 is conveniently of wash water or of a dilute acid for solubilizing heavy metals precipitates and is directed generally radially against the interior of the separation drum 9 so as to flow through the perforations therein and to encounter the materials on the main belt 7. A vacuum is maintained by means subsequently described on the outside of the main belt, or anti-wear belt if used, and causes the liquid entrained in the belt and applied as wash water to move through the belt, thus removing a portion of the contaminents.

Also, there is a second-stage spray 26 emanating from a nozzle 27 projecting from a manifold 28 likewise supported on the suction box 24 and appropriately supplied, usually with plain water. The sprays 21 and 26 are circumferentially confined by either a separator trough 29 or by a separator plate 30 supported from the suction box 24. Either or both the separator trough or plate can be duplicated, and each may have a flexible seal 35. The separator trough 29 may be used to drain excess wash water out the open end of the separation drum, and a level or flow sensor 38 may be used to indicate the amount of liquid drained from the trough 29, to control the rate of application of wash water at spray 21 and 26.

As the materials travel around the periphery of the drum 9 they are subjected to a succession of wash sprays. Also, the materials confined between the separation drum 9 and the main belt 7 are periodically subjected to subatmospheric pressures. For example, there is a suction header 31 having a suction slot with flexible seals 32 communicating with the interior of the suction header and disposed to contact and open against the surface of the anti-wear belt 12. The suction header 31 is connected by a pipe 33 to a suction blower 34 discharging air to the atmosphere and providing a reduced pressure within the pipe 33 and the suction header 31. Moisture within the pipe 33 falls through a barometric leg 36 and is received in a suitable overflow drain 37. Alternatively, the liquid may be removed by a pump (not shown). In this fashion there is removed from the suction header 31 a mixture of air and liquid. Some separation takes place so that the air is discharged by the blower 34 and the liquid overflows from the drain 37. The materials, of course, are those soluble or solubilized contaminants that are removed from the interior of the main belt, but no substantial amount of algae is so removed, for the perforations in the main belt 7 are too small to permit their passage.

Somewhat similarly there is provided a suction header 41 having its own suction slot and flexible seals 42 adjacent to and contacting the anti-wear belt 12 and also connected to the vacuum pipe 33. Comparably, there is another suction header 46 having a suction slot and flexible seals 47 resting against the surface of the anti-wear belt 12 in the portion thereof that is in substantial contact with the main belt and similarly connected to the vacuum line 33. Thus, the suction headers 31, 41 and 46 are all operated at subatmospheric pressure so that they all help remove liquid and air from the cake through the main belt 7 and the anti-wear belt 12. Preferably, each of the suction headers is rotatable about its own axis so that the seals 32, 42 and 47 can be brought adjustably into sufficiently close contact with the anti-wear belt surface so as to avoid undue leakage.

In effect, the suction headers 31 and 41, between them, define a chamber 51, and the suction headers 46 and 41 define another chamber 52. These chambers are preferably kept under modest vacuum and are connected to a system, not shown, for air and waste water evacuation and delivery, all as represented schematically by drain openings 53 and 54. In practice, the full chamber cross-section serves as a plenum leading from one end of the chamber to a vacuum blower and liquid discharge system similar to that shown for the suction header 31 and represented by the parts 33, 34, 36 and 37.

There is also a manifold 61 connected to a source of wash water and having a spray 62 designed to impinge upon the interior surface of the lower part of the auxiliary belt 12 for final wash purposes as the device is being shut down after a protracted run.

Preferably disposed near the uppermost portion of the separation drum 9 and conveniently mounted on the suction box 24, there is afforded a pair of movable seals 66 and 67 defining a passage 68 between them leading from the interior of the wall of the separation drum 9 to the interior of the suction box 24 that is maintained under a higher vacuum, so that solids removed from the main belt through the separation drum perforated wall are delivered to the suction box, from which they pass through the open end of the separation drum, represented schematically by an opening 69, to a cyclone separator (not shown).

In the general operation of this structure with the various sprays (except the spray 62) in effect, and with the various mechanisms properly connected, the filtration drum 6 revolves counterclockwise in the FIGURE, and the main belt 7 carrying the wet algae cake travels along the periphery of the separation drum 9 for a portion thereof, at least. The cake travel is then in between the drum 9 and the adjacent portion of the main belt 7. As the contained material and the mechanisms interact, the interior of the separation drum 9 is subjected to the sprays 21 and 26, whereas the outer surface of the superimposed anti-wear belt is subjected to subatmospheric pressure from the suction headers 31, 41 and 46. This tends to remove water, but the algae are held back by the smaller size of the perforations in the main belt 7. Also, whatever water flows into the chambers 51 and 52 is permitted to drain out through the openings 53 and 54. The major liquid and contaminant removal from the cake occurs at the suction headers, which operate at a higher vacuum than the intervening chambers. For example, the suction header 31 removes much of the initial water contained in the cake, which is then prepared for absorbing wash water from the spray 21. The chamber 51 also pulls some wash water through the cake and helps prevent wash water from running down the interior of the separation drum. This cycle is then repeated with the suction header 41 and chamber 52. The suction header 46 serves as the final moisture reduction means prior to cake recovery at the main suction box 24.

The effect of this operation is to remove much of the water and contaminants from the algae but permits the algae to be carried clockwise farther around the separation drum 9 and through the passage 68 into the suction box 24. The resulting agglomerated algae slurry than passes to the cyclone for recovery. In this fashion, the algae are largely separated from the water and are supplied in suitable slurry form of desirable solids concentration and relatively free from contaminating materials such as salts and heavy metals.

At the conclusion of any extended operation, the spray 62 is energized and the interior of the auxiliary belt is then washed, concurrent with washing of the main belt and other wetted parts.

I claim:

1. An apparatus for removing excess liquid from filter cake solids comprising a filtration drum rotatable in one direction about an axis, a perforated separation drum arranged adjacent to said filtration drum and simultaneously rotatable in the opposite direction about a parallel axis, a main perforated belt having an inside surface on which said cake is deposited and having an outside surface and disposed with said outside surface engaging said filtration drum and with said inside surface engaging said separation drum, an anti-wear belt having an outside surface and an inside surface, means for mounting said anti-wear belt in a closed loop having one portion with said outside surface of said anti-wear belt in contact with said outside surface of said main belt in a predetermined portion of said main belt lying against said separation drum, a main suction box within said separation drum and having an inlet in substantial communication with the interior surface of said separation drum in a zone of said separation drum contacted by said main belt, at least one suction header with a suction slot defined by seals disposed in substantial contact with said inside surface of said anti-wear belt in said one portion thereof and means within said separation drum for directing wash liquid toward the interior surface of said separation drum in said one portion thereof exteriorly contacted by said anti-wear belt.

2. A device as in claim 1 including a plurality of said suction headers spaced apart exteriorly and peripherally of said separation drum and within said closed loop of said anti-wear belt, said suction headers being disposed with the suction slots and seals thereof abutting against the inside surface of said anti-wear belt, means for mounting a pair of said suction headers to define a chamber between them, and means for draining said chamber.

3. A device as in claim 2 in which said chamber is maintained under subatmospheric pressure.

4. A device as in claim 1 in which said suction header and said means for directing wash liquid are substantially in the same radial alignment.

5. A device as in claim 1 including a plurality of suction headers spaced apart exteriorly and peripherally of said separation drum to define a chamber between them and with said chamber substantially in the same radial alignment as said wash liquid discharging means.

6. A device as in claim 1 in which said suction header in cross-section is circular about a central point, a pair of seals radially projecting from said suction header and bounding a slot, and means for making said suction header rotatably adjustable about said central point.

7. A device as in claim 1 in which said anti-wear belt is perforated, means for training said anti-wear belt to travel in a closed loop having one section of said outside surface thereof in contact with a section of the outside surface of said main belt radially spaced from engagement with said separation drum, and suction header seals contacting said inside surface of said anti-wear belt.

8. A device as in claim 7 in which said training means is a plurality of rollers parallel to said axis and in which said anti-wear belt is trained around said rollers to provide a concave portion of said anti-wear belt lying against an area of said main belt and moved in unison with said main belt by non-sliding frictional engagement between the two belts in the area of contact.

* * * * *